Figure 1:
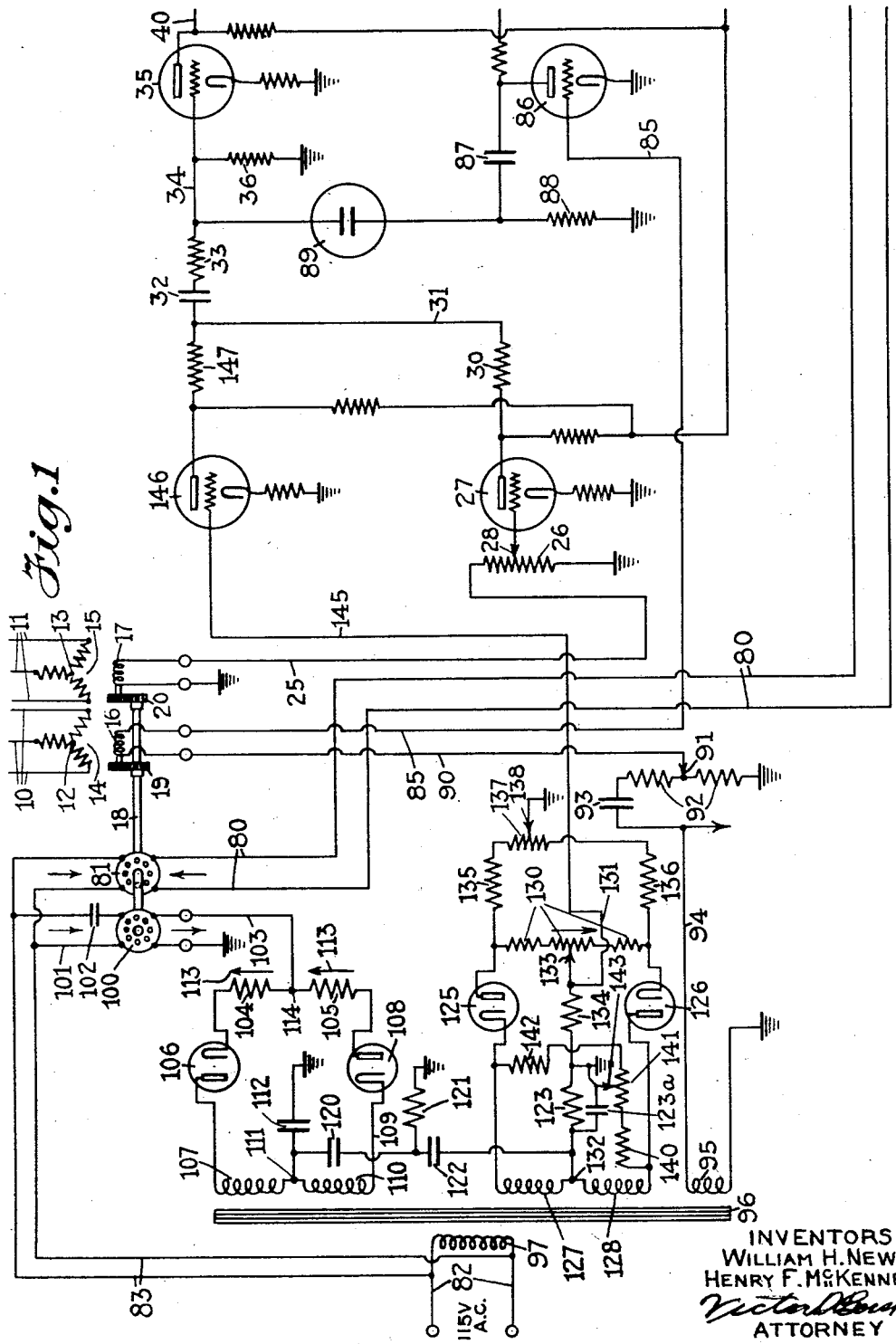

Patented Aug. 31, 1948

2,448,387

UNITED STATES PATENT OFFICE 2,448,387

ELECTRIC MOTOR FOLLOW-UP SYSTEM

William H. Newell, New York, and Henry F. McKenney, Flushing, N. Y., assignors to Ford Instrument Company, Inc., Long Island City, N. Y., a corporation of New York Application April 23, 1946, Serial No. 664,206

1 Claim. (Cl. 318—30)

This invention relates to motion reproducing units and more particularly to a unit involving an electrically driven prime mover which is connected to respond to a position indicating signal in an electrical synchroreceiver.

The present invention is applied to a synchroreceiver of the type having a rotor in which a voltage is induced which is dependent upon its angular position relative to the position of the rotor of a remote synchro-transmitter. When the rotor is in correspondence with the rotor of the transmitter a zero voltage is produced. When the rotor is out of correspondence a plus or minus voltage is produced depending upon the direction and angular extent of the error. The present invention provides an electrical channel responsive to the error voltage produced in the synchro rotor and connected to drive a motor in a direction to bring the rotor to zero voltage position.

It is an object of the invention to provide a novel and improved system of the above type.

Another object is to provide a system of the above type in which the motor is caused to follow accurately the incoming signals without hunting or overrunning.

Another object is to provide a system of the above type having novel and improved details of construction and features of operation.

Various other objects and advantages will be apparent as the nature of the invention is more fully disclosed.

The present system utilizes a pair of receiving units connected for coarse and fine control respectively. The units may for example be interconnected to drive at a 36 to 1 ratio so that the fine control unit makes a complete revolution for each 10° movement of the coarse control unit. The system is so arranged that the driving motor is normally under control of the fine control unit. However, when the error exceeds a predetermined angular amount on the coarse control unit, the coarse receiver takes control and retains control until the error is again reduced to this predetermined amount. The point at which the coarse control takes effect is selected to prevent the fine control from synchronizing in its 180° or reverse position, and preferably takes effect at the maximum voltage position of the fine control element. For example with a 36 to 1 ratio as above specified the maximum voltage position of the fine unit would correspond to 2½° on the coarse control unit. Hence the system may be arranged so that the coarse control takes over whenever the error exceeds 2½° plus or minus.

In a system of the above type there would normally be a possibility that the coarse control unit would synchronize in its 180° or reverse position. In order to avoid this contingency an offsetting voltage is introduced which offsets the reverse zero voltage position of the coarse control unit from its 180° point by an amount such that the zero voltage position of the fine control unit will not coincide with the zero voltage position of the coarse control unit at its reverse position. In the example given above the offset voltage may be so selected as to offset the reverse zero voltage position on the coarse control unit by about 2½° from the 180° point. This position would then correspond to a maximum voltage position on the fine control unit and the two units would not both reach zero voltage position at other than their correct forward synchronized position.

Another feature of the invention involves converting the control voltage, which is normally proportional to the angular error, into a substantially constant voltage suited to produce maximum torque on the drive motor over a wide range of angular error. The drive motor is thus able to operate at maximum efficiency for bringing the receiver into exact registration with the incoming signal.

The control voltage of course decreases to zero and reverses when the zero position is approached and passed. In order to obtain maximum driving power throughout a large portion of the angular range without causing the motor to overrun and hunt a braking voltage is introduced which is proportional either to the acceleration or the rate of change of acceleration of the driving motor, and introduces a braking effect which is adapted to bring the motor to rest at the zero voltage position without overrunning. The control voltage is preferably proportional to the second derivative of the rate of the driving motor which corresponds to rate of change of acceleration.

The invention also includes a novel means for obtaining an A. C. voltage which is proportional to a derivative of the rate of drive. For this purpose an alternating voltage is produced having an amplitude proportional to the rate of drive of the driving motor. This alternating voltage is converted into a D. C. voltage which is likewise proportional to the rate of drive. The D. C. voltage is differentiated twice by a differentiating network to obtain a voltage which is proportional to the second derivative of the rate of drive, that is to the rate of change of acceleration. This latter D. C. voltage is then reconverted to an alternating voltage which is likewise proportional to the rate of change of acceleration and is in phase with the voltage from the fine receiver with which it is combined for controlling the driving motor.

Although the novel features which are believed to be characteristic of the invention are pointed out more particularly in the claim appended hereto, the nature of the invention will be better understood by referring to the following description taken in connection with the accompanying drawings in which a specific embodiment thereof is set forth for purposes of illustration.

Figure 2:
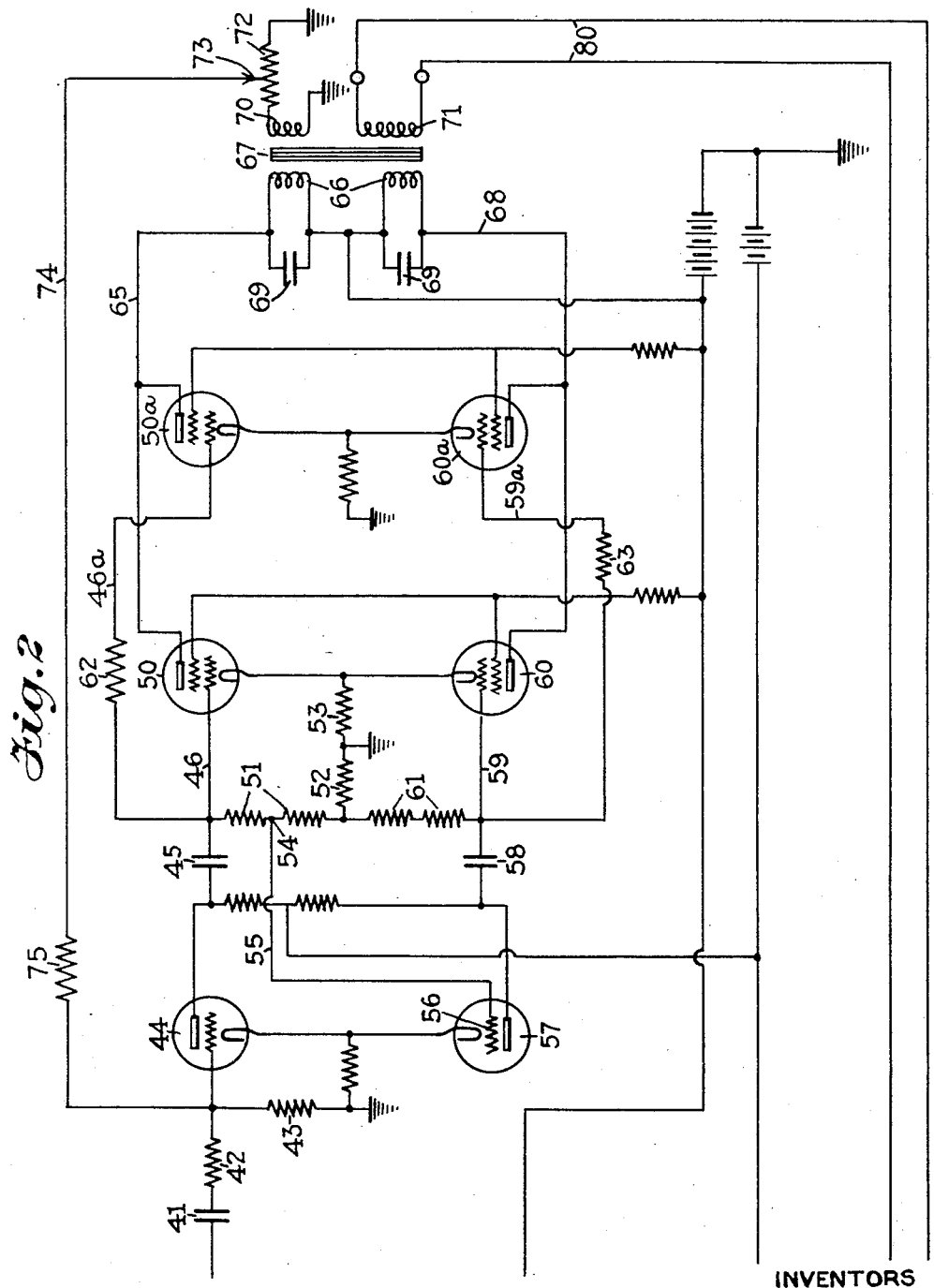

In the drawings:

Figs. 1 and 2 placed side by side constitute a schematic diagram of a system embodying the present invention.

Referring to the drawings more in detail, the incoming signal on lines 10 and 11 is fed to the stators 12 and 13 of synchro receivers 14 and 15 respectively having rotors 16 and 17 which are arranged to be positioned by a drive shaft 18 through gears 19 and 20 respectively. The gears 19 and 20 are so arranged that the rotor 17 makes several complete revolutions for each revolution of the rotor 16. For example, the rotor 17 may make 36 revolutions for each revolution of the rotor 16.

The synchro receivers 14 and 15 are of the usual construction and are arranged so that the voltage in the rotors 16 and 17 vary as a function of the angular displacement of the rotors from the positions of corresponding rotors in the remote synchro transmitters from which the incoming signal is received. When the rotors are in correspondence with the positions of the transmitters a zero voltage is induced therein from the stators 12 and 13.

In the embodiment shown the voltage induced in the rotor 17 is supplied by a line 25 and resistor 26 to the input circuit of an amplifier tube 27. The resistor 26 is provided with a variable tap 28 so that the voltage applied to the amplifier 27 may be adjusted as desired. This voltage constitutes the A. C. voltage induced in the rotor 17 and corresponds to the error in position of the fine adjustment receiver 15. The output voltage from the amplifier 27 is fed through resistor 30 and line 31 to a combining network comprising a condenser 32 and resistors 33 and 36. The resistor 36 is connected by a line 34 across to the input circuit of an amplifier tube 35. The resistors 33 and 36 which may be of the order of 1 megohm each constitute in effect a voltage divider network.

The output of the amplifier tube 35 is connected by a line 40 through condenser 41 and resistors 42 and 43 to the input circuit of an amplifier tube 44. The output circuit of the amplifier tube 44 is supplied through a condenser 45 and a line 46 to the input circuit of an amplifier tube 50. The input circuit of the amplifier tube 50 is connected to ground through a pair of resistors 51 and a resistor 52 connected in series. A resistor 53 is connected between the cathode of the tube 50 and ground to provide a bias voltage. The common point 54 of the resistors 51 is connected by a line 55 to the grid 56 of an amplifier tube 57. The output circuit of the amplifier tube 57 is connected through condenser 58 and line 59 to the input of an amplifier tube 60. Resistors 61 are connected between the line 59 and the resistor 52 and form with the resistors 51, a balancing network.

It will be noted that the output voltage of the amplifier tube 44 is greater than the input voltage by the gain ratio of the tube and is reversed in phase. The voltage divider resistor 51 is so selected that the ratio of the voltage supplied by the line 55 to the grid 56 of the amplifier 57 is inversely proportional to the gain ratio of the amplifier 44 and hence is of the same value as the input voltage to the amplifier tube 44, but differs in phase by 180° from the input voltage to the tube 44. The amplifier tube 57 again reverses the phase of its output current so that the output of the tube 57 is 180° displaced in phase from the output from the tube 44. The above described connections are such that the tubes 44 and 57 are caused to operate as push-pull amplifiers. The resistance network including resistors 51, 61, and 52 are used to cause push-pull operation of the tubes 44 and 57 and could, of course, be replaced by the push-pull input transformer to the tubes 44 and 57. The resistance network however is more compact and provides a more faithful reproduction of the input signal.

The tubes 50 and 60 which are supplied respectively by the tubes 44 and 57 likewise constitute push-pull amplifiers. For increased power a second pair of tubes 50a and 60a are connected in parallel with the tubes 50 and 60 respectively. The input circuit of the tubes 50a and 60a being connected to the lines 46 and 59 respectively by lines 46a and 59a and resistors 62 and 63. The output circuits of the tubes 50 and 60a are connected by lines 65 to a split primary 66 of an output transformer 67. The output circuit of the tubes 60 and 60a is connected through a line 68 to the split primary 66. The primary winding 66 may be tuned by condensers 69 to the fundamental frequency of the applied voltage so as to eliminate or reduce the harmonics and extraneous voltages. The output transformer 67 is provided with a pair of secondaries 70 and 71. The secondary 70 is connected through a resistor 72 to ground and a point 73 of the resistor 72 is connected by a line 74 and a resistor 75 to the input side of the tube 44 to constitute a negative feedback which eliminates or suppresses the distortion or pickup voltages which may be produced by the operation of the amplifiers. The secondary 71 constitutes the output secondary and is connected by leads 80 to supply power to a reversible drive motor 81 which is connected to drive the shaft 18. The field of the drive motor 81 is supplied from a 115 volt A. C. line 82 by a line 83. The connections of the lines 80 to the drive motor 81 is such that the drive motor is caused to rotate in a direction to bring the rotor 17 to zero voltage position.

The rotor 16 of the coarse receiver is connected by a line 85 to the input circuit of an amplifier tube 86. The output circuit of the amplifier tube 86 is connected through a condenser 87 and resistor 88 to ground and through condenser 87 and a gas tube 89 to the input line 34 to the amplifier tube 35 at a point between the resistors 33 and 36. The arrangement is such that the gas tube 89 is normally inoperative and prevents any voltage from being supplied from the tube 86 to the input of the tube 35. However, a voltage is developed by the tube 86 which as pointed out above is proportional to the error in the position of the rotor 16. The connection is such that when this voltage exceeds a predetermined value corresponding to a predetermined angular error, the gas tube 89 becomes conductive and allows the voltage from the tube 86 to be supplied to the input of the amplifier tube 35. The tube 86 thus becomes a low resistance path in parallel to the high resistance 36 and thus eliminates the effect of any incoming voltage from the fine receiver on the amplifier 35 and subsequent elements of the circuit. The amplifier 35 is then virtually under the control of the amplifier 86 and the succeeding portions of the circuit respond to the signal from the coarse receiver 14 instead of to signals from the fine receiver 15.

In order to offset the reverse zero position of the rotor 16 from its 180° point for the purpose above mentioned the rotor 16 is connected by a line 90 to a point 91 in a resistor network comprising resistors 92, thence to ground. The resistors 92 are connected through a condenser 93 and line 94 to a secondary 95 of a transformer 96 having a primary 97 connected to the A. C. line 82. The value of the offsetting voltage is determined by the position of the point 91 with respect to the resistors 92 and is so selected that the offsetting voltage corresponds to about 90° on the fine rotor 17 which in the example chosen, namely 36 to 1 ratio, constitutes 2½ degrees movement of the coarse rotor 16. It is noted that this offsetting voltage is introduced into the rotor 16 in series with the voltage induced from the stator 12 of the receiver 14. The condenser 93 is a phasing condenser to bring the offsetting voltage into phase with the error voltage in the rotor 16. The rotor 16 is of course so positioned with respect to the shaft 18 that its zero voltage position in a forward direction corresponds to the zero voltage position of the rotor 17, whereas its zero voltage position in the reverse direction is offset from the 180° point by an amount determined by the value of the offsetting voltage from the resistors 92 as above mentioned.

In order to obtain a braking voltage for the purpose referred to above an induction generator 100 is connected to be driven by the shaft 18. The field of the generator 100 is supplied by lines 101 with 115 v. from the A. C. line 82 through a phasing condenser 102 which is designed to make the output voltage in phase with the voltage of the A. C. line 82. The output of the induction generator is supplied by a line 103 to a bridge circuit comprising a pair of resistors 104 and 105 connected in series. One end of resistor 104 is connected to the cathode of a rectifier tube 106, the anode of which is connected to a winding 107 constituting a secondary of the transformer 96. The resistor 105 is connected to the anode of a rectifier tube 108, the cathode of which is connected by a line 109 to a winding 110 likewise constituting a secondary of the transformer 96. The windings 110 and 107 are connected together at 111. The point 111 is grounded through a condenser 112. It will be noted that the resistors 104 and 105, rectifiers 106 and 108 and windings 107 and 110 are connected in series circuits so that current flows therethrough in the direction of the arrows 113. The line 103 is connected to the common point 114 of the resistors 104 and 105. The elements are so chosen that with current flowing through the circuits derived from the secondaries 107 and 110, the points 111 and 114 are of equal potential, and no voltage is applied to the condenser 112. However, when voltage is supplied to the point 114 by the line 103 the current flowing through the respective halves of the bridge circuit including tubes 106 and 108 becomes unbalanced and a voltage appears across the condenser 112. This voltage across the condenser 112 is in the form of D. C. voltage which is proportional to the A. C. voltage supplied to the point 114. The bridge circuit including the tubes 106 and 108, resistors 104, 105, secondaries 107 and 110 accordingly convert the applied A. C. voltage to a proportional D. C. voltage.

The high voltage side of the condenser 112 is connected to ground through a condenser 120 and a resistor 121. The condenser 112 discharges through the condenser 120 and the resistor 121 at a rate to maintain equilibrium. When the voltage on the condenser 112 is constant, there will be no current flow through the resistor 121 except for the negligible leakage current. When, however, the voltage across the condenser 112 changes the condenser discharges in a succession of discharges through the condenser 120 and resistor 121 until equilibrium is again established. Consequently the current through the resistance 121 corresponds to the rate of change of the A. C. voltage applied by the line 103. Since the voltage supplied by the generator 100 is proportional to the rate or velocity of the shaft 18, the voltage developed across the resistor 121 corresponds to the derivative of the velocity or acceleration.

The condenser 120 is in turn connected through the condenser 122 and a resistor 123 to ground. The condenser 122 and resistor 123 act in a manner similar to the condenser 120 and resistor 121 to develop a voltage across the resistor 123 which is proportional to the rate of change of voltage across the resistor 121. This voltage accordingly is proportional to the rate of change in velocity or to the second derivative of the velocity of the shaft 18. The resistor 123 may be replaced or supplemented by a condenser 123a if desired.

In order to convert this D. C. voltage which represents the second derivative of velocity to a corresponding alternating voltage, a bridge network is provided which comprises tubes 125 and 126, secondaries 127 and 128 and resistor network including resistors 130, connected in series circuit so that current will flow through the circuit in the direction of the arrow 131 in response to voltage induced in the secondary coils 127 and 128. The resistor 123 is connected between a point 132 between the secondaries 127 and 128 and ground, adjustable tap 133 on the resistors 130 is grounded through a resistor 134. A resistor network including resistors 135, 136 and 137 is connected across the resistors 130 and an adjustable tap on the resistor 137 is connected to ground.

A resistor network including resistors 140, 141 and 142 is connected across windings 127 and 128 and an adjustable tap 143 on the resistor 141 is connected to ground. The adjustable tap 133 of the resistor 130 is connected by a line 145 to the input circuit of an amplifier tube 146, the output circuit of which is connected through a resistor 147 to the combining network including the condensers 32 and 33.

The bridge circuit including the tubes 125 and 126 is so adjusted by suitable adjustment of the taps 133 and 137 that with no voltage across the resistor 123 the current flowing through the series circuits due to the secondaries 127 and 128 is balanced and no voltage appears across the resistor 134. However, when a D. C. voltage is applied to the resistor 123 this balance is upset with the result that an A. C. voltage appears across the resistor 134 which is proportional to the D. C. voltage supplied to the resistor 123. This A. C. voltage appearing across the resistor 134 is supplied to the amplifier tube 146 and thence to the combining network to be combined with the control voltage. This alternating voltage, which is in phase with the control voltage and is proportional to the second derivative of the velocity of the shaft 18, is introduced into the system in a sense to introduce a braking effect on the drive motor which tends to bring the same to rest. Due to the fact that this voltage is proportional to the rate of change of acceleration of the drive motor it appears only in that portion of the cycle of operation during which the drive motor is accelerating or decelerating as it approaches its zero position.

As pointed out above the voltage applied to the amplifier 35 is proportional to the angle of error of either the fine control receiver or the coarse control receiver. As the zero position is approached the fine control receiver is in control. The amplifiers are so designed that when the voltage supplied by the rotor 17 of the fine receiver is less than a predetermined value the amplifier output voltage is proportional to the applied voltage. When, however, the input voltage exceeds this predetermined value the amplifier output voltage remains constant, but is converted to a square wave form. The power amplifier system is so designed that this square wave voltage will represent full voltage for the driving motor, for example 115 volts, so that full voltage is supplied thereto throughout the constant voltage area. In one embodiment for example the rotor 17 may develop a half of volt for 30 minutes error which would correspond to about 1 minute error on the coarse control rotor 16. Hence a voltage of one volt developed in the rotor 17 would correspond to an error of about two minutes in the coarse receiver 14. The system is preferably designed so that within this one volt range, which corresponds to a 2 minute error, the response of the amplifier 35 is proportional to the input voltage, but beyond this range the output voltage of the amplifier 35 becomes constant and suited when amplified through the push-pull amplifier stages described above to supply 115 volts to the driving motor 81. In this way a full torque is produced by the driving motor throughout its entire range of movement beyond a plus or minus two minute error and the acceleration and deceleration must take place during this plus or minus two minute movement. The braking effect of the second derivative voltage derived from the induction generator 100 through the bridge networks above described is accordingly utilized to introduce a braking effect which is proportional to the rate of change of acceleration and is designed to bring the motor to rest within this relatively short plus or minus two minute error range during which the control voltage is proportional to velocity.

The amplification factor of the amplifiers is limited by the effect of the voltage at zero position of the fine adjustment rotor which may be of the order of 0.1 volt and consists of torque producing harmonics and quadrature 60 cycle components which would tend to overload the amplifier but produce no torque. In the above described system an over-all amplification factor of 1 to 115 has been assumed. The constant voltage range of the system should be as long as possible in order to maintain maximum driving efficiency of the motor. However, the constant voltage range is limited by the minimum angular range within which the motor can be brought to rest without over-shooting to the opposite constant voltage area.

Although a specific embodiment of the invention has been shown for purposes of illustration, it is to be understood that system and component parts thereof are capable of various uses and that the scope of the invention is only to be restricted in accordance with the following claim.

What is claimed is:

In an electric follow-up system, a pair of receivers having field windings carrying the received position signal and having rotors in which a voltage is induced which is a function of their angular displacement from a zero voltage position corresponding to the received position signal, said rotors being coupled to rotate at different rates to constitute coarse and fine control rotors, respectively, a driving motor for said rotors, an electric control channel for said motor including amplifiers, means supplying a control voltage to said channel from said fine control rotor suited to drive said rotor to zero voltage position, and a circuit to supply a control voltage to said channel from said coarse control rotor, said circuit including an amplifier tube having an input circuit connected directly to said coarse control rotor and having an anode circuit connected to said channel and a gas tube connected in said anode circuit to isolate said coarse control means from said channel, said tube being arranged to become conductive only when the control voltage from said last rotor exceeds a value representing a predetermined error in position.

WILLIAM H. NEWELL.
HENRY F. McKENNEY.

REFERENCES CITED

The following references are of record in the file of this patent:

UNITED STATES PATENTS

| Number | Name | Date |
|---|---|---|
| 2,233,415 | Hull | Mar. 4, 1941 |
| 2,376,359 | Hultin | May 22, 1945 |
| 2,407,876 | Godet | Sept. 17, 1946 |
| 2,409,970 | Agins | Oct. 22, 1946 |
| 2,411,573 | Holst et al. | Nov. 26, 1946 |